United States Patent
Kamoi

(10) Patent No.: US 9,575,701 B2
(45) Date of Patent: Feb. 21, 2017

(54) IMAGE FORMING APPARATUS USING WI-FI HANDOVER TECHNIQUE, CONTROL METHOD THEREFOR, AND STORAGE MEDIUM

(71) Applicant: CANON KABUSHIKI KAISHA, Tokyo (JP)

(72) Inventor: Keiko Kamoi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/729,273

(22) Filed: Jun. 3, 2015

(65) Prior Publication Data

US 2015/0355874 A1 Dec. 10, 2015

(30) Foreign Application Priority Data

Jun. 4, 2014 (JP) .................................. 2014-115747

(51) Int. Cl.
| | |
|---|---|
| G06F 3/12 | (2006.01) |
| H04N 1/00 | (2006.01) |
| G06K 15/02 | (2006.01) |
| H04W 4/00 | (2009.01) |

(52) U.S. Cl.
CPC ............. *G06F 3/1292* (2013.01); *G06F 3/126* (2013.01); *G06F 3/1212* (2013.01); *H04N 1/00127* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 8,929,811 B2 | 1/2015 | Yang et al. | |
| 2007/0208863 A1* | 9/2007 | Otsuka | H04N 1/00222 709/227 |
| 2010/0225962 A1* | 9/2010 | Okigami | H04L 63/0492 358/1.15 |
| 2013/0258402 A1* | 10/2013 | Arai | H04N 1/00344 358/1.15 |

(Continued)

FOREIGN PATENT DOCUMENTS

| | | |
|---|---|---|
| JP | 2002344687 A | 11/2002 |
| JP | 2013045462 A | 3/2013 |

*Primary Examiner* — Beniyam Menberu
(74) *Attorney, Agent, or Firm* — Rossi, Kimms & McDowell LLP

(57) ABSTRACT

An image forming apparatus which is capable of continuously offering a function of the image forming apparatus to a user, who is using the image forming apparatus by operating a mobile terminal, without interruption by other terminals. When a wireless communication is established using NFC (near-field communication), a request to execute a job from mobile terminals other than the mobile terminal is rejected from when the wireless communication is established to when a connection release request from the mobile terminal is received. When a request to execute a job is received using Wi-Fi without a wireless communication being established using NFC, a request to execute a job from mobile terminals other than the mobile terminal which has sent the request to execute the job is rejected from when the request to execute the job is received to when execution of the job is completed.

7 Claims, 10 Drawing Sheets

(56) References Cited

U.S. PATENT DOCUMENTS

| | | | | |
|---|---|---|---|---|
| 2014/0085676 A1* | 3/2014 | Kishimoto | ......... | H04N 1/00233 358/1.15 |
| 2015/0277823 A1* | 10/2015 | Nakayama | ......... | G03G 15/5087 358/1.14 |
| 2016/0004497 A1* | 1/2016 | Nishi | .................... | G06F 3/1292 358/1.15 |
| 2016/0011824 A1* | 1/2016 | Ishimura | ............. | H04W 76/064 358/1.15 |

* cited by examiner

IMAGE FORMING APPARATUS USING WI-FI HANDOVER TECHNIQUE, CONTROL METHOD THEREFOR, AND STORAGE MEDIUM

BACKGROUND OF THE INVENTION

Field of the Invention

The present invention relates to an image forming apparatus, a control method therefor, and a storage medium, and in particular to a Wi-Fi handover technique for an image forming apparatus.

Description of the Related Art

In recent years, NFC (near-field communication) which is one of near-field wireless communication technologies (contactless communication technologies) has been in widespread use in various fields. NFC enables communication in a very short range and provides control to establish a wireless link when communicating devices are put close to each other within several centimeters and disconnect the wireless link when they are moved away from each other. Communication between NFC-enabled devices is enabled only by putting them close to each other. For this reason, NFC is receiving attention and going into actual use in various fields since it offers various services for users who own NFC-enabled devices. For example, there is a service which uses a device equipped with an NFC tag and a mobile terminal equipped with an NFC tag reader/writer and enables a user to know detailed statuses of the device by seeing the mobile terminal while he or she stays at the location of the device.

Also, based on information such as a URI scheme, an SSID, and an encryption key written in an NFC tag, an arbitrary mobile application is started, and Wi-Fi handover is performed. For example, Japanese Laid-Open Patent Publication (Kokai) No. 2013-45462 discloses a technique to automatically select and execute an application that matches tab information read from an NFC tag.

Since mobile terminals such as smartphones and tablet terminals have more excellent operability, responsivity, and visibility than those of an operating unit in a main body of an image forming apparatus, using those mobile terminals as a lower-cost alternative to an operating unit of an image forming apparatus using wireless communication including NFC is being contemplated. Also, various mobile terminal solutions which expand existing functions of an image forming apparatus are being contemplated, and in the future, an increasing number of mobile terminals are likely to be operate in collaboration with image forming apparatuses.

A pull scanning function of causing an image forming apparatus to scan and send by remotely controlling it using an application on a mobile terminal has already been made public. Japanese Laid-Open Patent Publication (Kokai) No. 2002-344687 discloses a technique according to which a user processes and edits an image read by an image reader, converts the image into an image format suitable for a communication terminal or the like, and sends it to a mobile terminal or the like.

A pull scanning function of an image forming apparatus is host-driven and generally processes operation setting requests from external devices in the order in which they were received. If an NFC-enabled image forming apparatus is allowed to receive pull scanning instructions at the same time from a plurality of external apparatuses such as mobile terminals and PCs, a problem described hereafter may arise.

First, when a first user uses a pull scanning function while a second user who uses a pull scanning function is setting a reading mode, an image read by the second user using an image forming apparatus may be passed to the first user.

On the other hand, when a user is using an image forming apparatus, providing exclusive control to reject an operating setting request from external devices for a predetermined period of time will increase a time period for which other users have to wait and may decrease usability and availability of the image forming apparatus.

Moreover, a pull scanning function uses an ADF (auto document feeder) in an apparatus main body, and hence it is necessary to consider how to implement exclusive control in a case where a resource conflict occurs in the apparatus main body without decreasing usability and availability of the image forming apparatus.

SUMMARY OF THE INVENTION

The present invention provides an image forming apparatus and a control method therefor which are capable of continuously offering a function of the image forming apparatus to a user, who is using the image forming apparatus by operating a mobile terminal, without interruption by other terminals, as well as a storage medium.

Accordingly, the present invention provides an image forming apparatus which executes a job in response to an instruction from a communication terminal, comprising a communication unit configured to, after a wireless communication with the communication terminal put close to the image forming apparatus is established using a first communication method, establish a communication using a second communication method different from the first communication method, wherein when a wireless communication is established using the first communication method, the communication unit rejects a request to execute a job from communication terminals other than the communication terminal from when the wireless communication is established to when a connection release request from the communication terminal is received, and when a request to execute a job is received using the second communication method without a wireless communication being established using the first communication method, the communication unit rejects a request to execute a job from communication terminals other than the communication terminal, which has sent the request to execute the job, from when the request to execute the job is received to when execution of the job is completed.

According to the present invention, a token is stored in a RAM only when NFC connection with a communication terminal is detected, and a job setting/execution request from terminals other than the communication terminal is rejected until the token stored in the RAM is discarded. As a result, a function of the image forming apparatus is continuously offered to a user, who is using the image forming apparatus by operating a mobile terminal, without interruption by other terminals.

Further features of the present invention will become apparent from the following description of exemplary embodiments (with reference to the attached drawings).

BRIEF DESCRIPTION OF THE DRAWINGS

FIGS. 8A and 8B are views showing exemplary screens displayed on an operating panel of the image forming apparatus, in which FIG. 8A shows a continuation confirmation screen, and FIG. 8B shows an error screen for providing notification of a time-out error.

FIGS. 9A to 9C are views showing exemplary screens displayed on a display unit of the mobile terminal, in which FIG. 9A shows an error screen displayed when tokens do not match as a result of collation, FIG. 9B shows an error screen for providing notification of a communication error, and FIG. 9C shows a continuation confirmation screen.

DESCRIPTION OF THE EMBODIMENTS

The present invention will now be described in detail with reference to the drawings showing an embodiment thereof.

Figure 1:
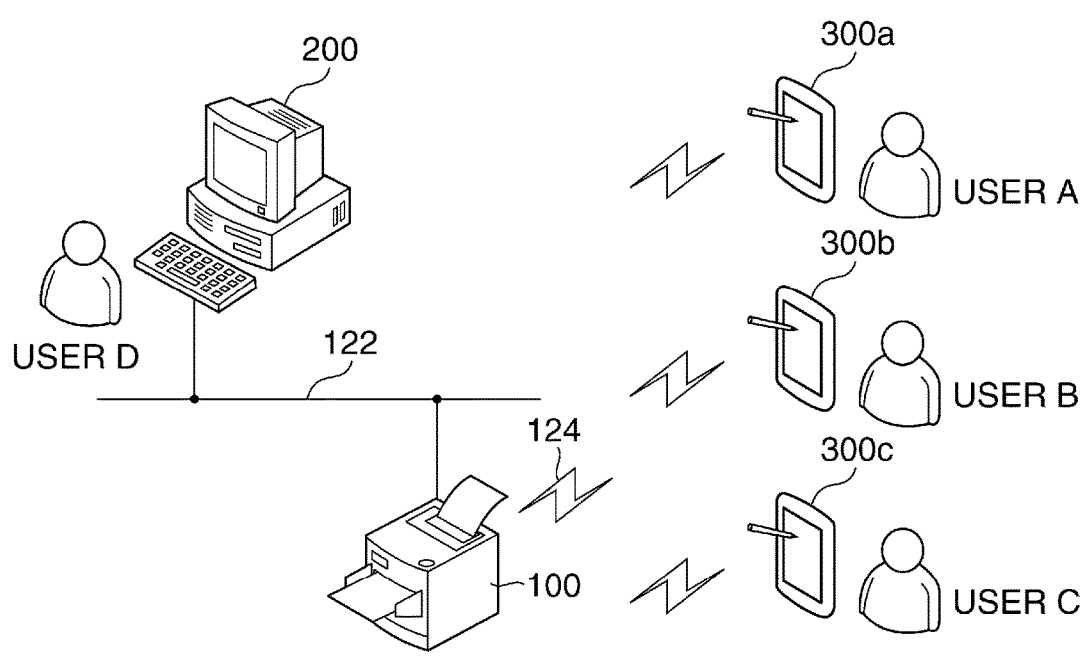
FIG. 1 is an exemplary usage environment of an image forming apparatus according to an embodiment of the present invention.

FIG. 1 is an exemplary usage environment of an image forming apparatus according to an embodiment of the present invention.

The image forming apparatus 100 is a multifunctional peripheral and connected to an external apparatus 200 such as a general-purpose computer, which is used by a user D, via a wired network 122 such as a LAN. The image forming apparatus 100 is wirelessly connected to a plurality of mobile terminals 300a, 300b, and 300c (hereafter collectedly referred to as "the mobile terminal 300") which are used by users A, B, and C, respectively, via a wireless network 124 using wireless communication technologies such as Wi-Fi or Bluetooth (registered trademark).

The mobile terminal 300 (communication terminal), which is a smartphone, a tablet terminal, or the like, is allowed to be used as an external operating means for the image forming apparatus 100 by wireless connection. For example, the mobile terminal 300 is able to send an operation setting request and a scan job execution request to the image forming apparatus 100 via the wireless network 124.

The image forming apparatus 100 and the mobile terminal 300 are capable of carrying out near-field wireless communications using, for example, NFC (near-field communication). For example, near-field wireless communication is established by touching the image forming apparatus 100 with the mobile terminal 300, and for example, information required for Wi-Fi connection (an SSID and an encryption key) is allowed to be configured on the mobile terminal 300 from the image forming apparatus 100. This enables intercommunication between the mobile terminal 300 and the image forming apparatus 100 using Wi-Fi to be started without the need to perform any complicated connecting operations.

The external apparatus 200 is able to send operating instructions to the image forming apparatus 100 through wired communication via the wired network 122 and send print data to the image forming apparatus 100 and cause the image forming apparatus 100 to execute a job such as a print job.

Figure 2:
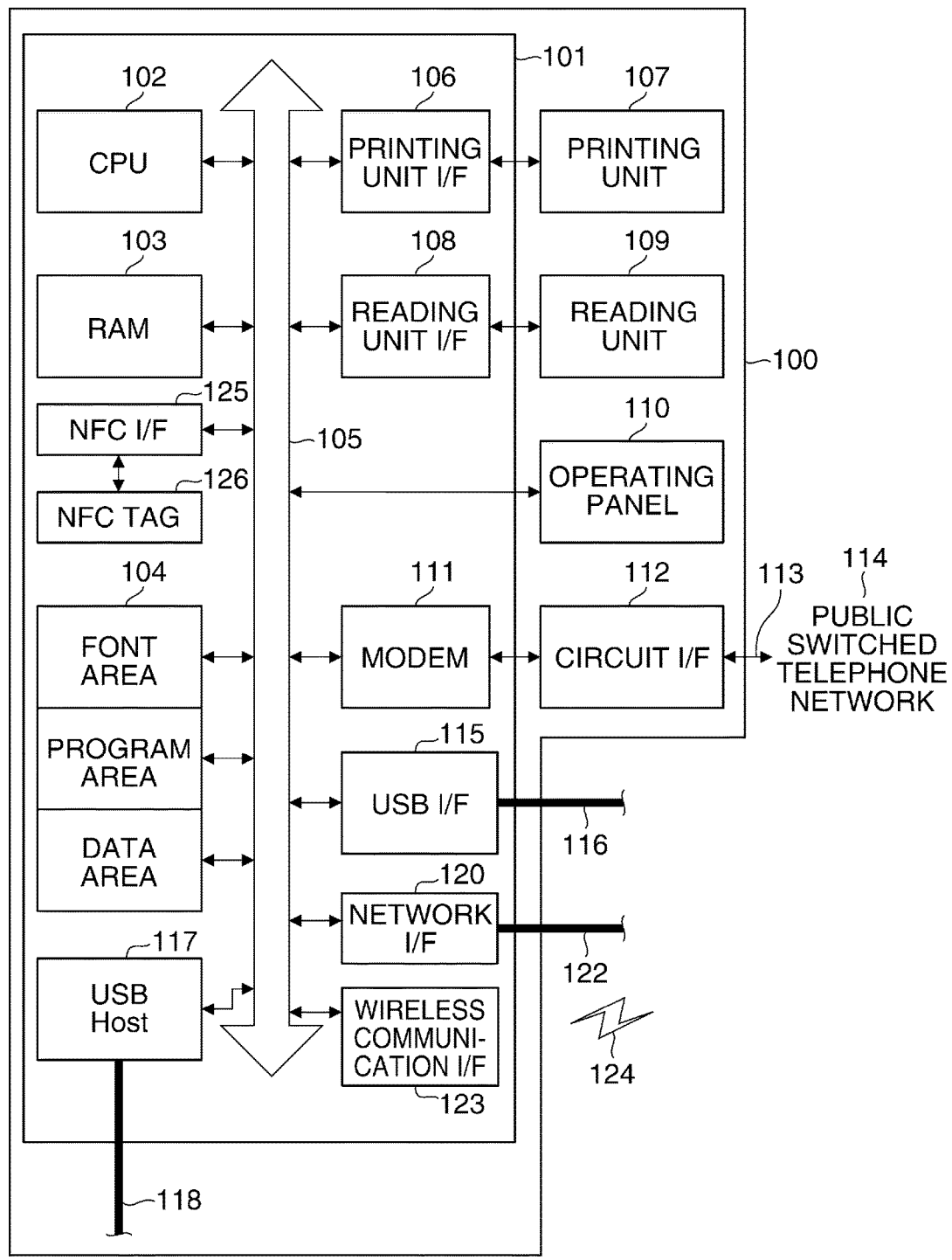
FIG. 2 is a block diagram schematically showing an exemplary hardware arrangement of the image forming apparatus in FIG. 1.

FIG. 2 is a block diagram showing an exemplary hardware arrangement of the image forming apparatus 100 in FIG. 1.

The image forming apparatus 100 has a printing unit 107, a reading unit 109, an operating panel 110, a circuit I/F 112, and a controller unit 101 which plays a pivotal role in controlling them.

The controller unit 101 has a CPU 102, a RAM 103, a ROM 104, a printing unit I/F 106, a reading unit I/F 108, a MODEM 111, a USB I/F 115, a network I/F 120, a USB Host 117, a wireless communication I/F 123, and an NFC I/F 215. These blocks are connected to one another via a system bus 105.

The CPU 102 controls the entire apparatus in accordance with various control programs. The various control programs are executed by reading out control programs stored in a program area of the ROM 104. The various control programs are also executed by decompressing compressed programs stored in the program area of the ROM 104 and expanding them on the RAM 103. It should be noted that the various control programs mentioned above may be stored in a compressed or uncompressed form in a hard disk drive (HDD), not shown.

The network I/F 120 allows communications with the external apparatus 200 via the wired network 122. The wireless communication I/F 123 allows wireless communications with the mobile terminal 300 and others via the wireless network 124. The MODEM 111 connects to a public switched telephone network 114 via the circuit I/F 112 and allows communications with other image forming apparatuses, facsimile apparatuses, phones, and so on, which are not shown. The circuit I/F 112 and the public switched telephone network 114 are generally connected together by a telephone line 113 or the like.

The printing unit I/F 106 acts as an interface which outputs an image signal to the printing unit 107 (printer engine). The reading unit I/F 108 acts as an interface which receives a reading image signal from the reading unit 109 (scanner engine). The CPU 102 processes an image signal input from the reading unit I/F 108 and outputs the processed image signal as a recording image signal to the printing unit I/F 106.

The USB Host 117 connects to a USB memory (not shown), which is an external medium, via a USB connector 118 complying with USB standards to write and read files into and from the USB memory.

The CPU 102 displays characters and symbols on a display unit of the operating panel 110 using font information stored in a font area of the ROM 104 and receives instructional information from the operating panel 110 which has received an instruction from a user.

The CPU 102 stores device information on the image forming apparatus 100 and phonebook information, division management information, etc. on users in a data area of the ROM 104, and such information is read out by the CPU 102 as the need arises and updated by the CPU 102 as the need arises.

The NFC I/F 125 is an interface to an NFC tag 126, and in accordance with control by the CPU 102, outputs signals to the NFC tag 126. The NFC tag 126 is an IC tag which generates an electromagnetic field with which communication is possible only in a short range to enable near-field wireless communication between NFC-enabled devices. It should be noted that although in the example shown in the figure, the reading unit 109 and the printing unit 107 are configured to be inside with image forming apparatus 100, one or both of them may be configured to be outside the image forming apparatus 100.

Figure 3:
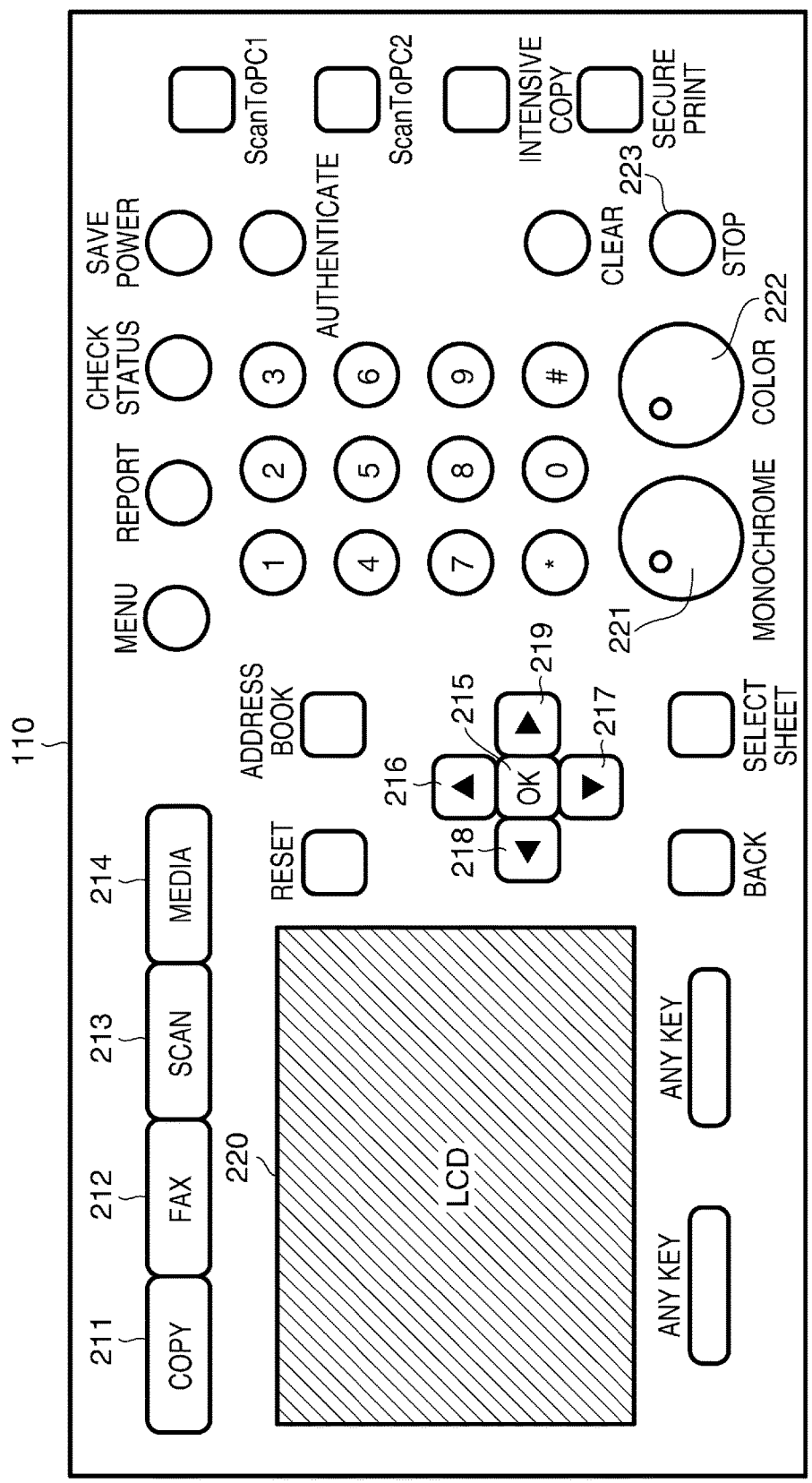
FIG. 3 is a view showing an exemplary appearance of an operating panel in FIG. 2.

FIG. 3 is a view showing an exemplary appearance of the operating panel 110 in FIG. 2.

A copy key 211, a fax key 212, a scan key 213, and a media direct print key 214 which are function keys are placed on the operating panel 110. When any of the function keys is depressed, the display screen of a display unit 220 such as an LCD (liquid crystal display) switches to a basic screen for a job selected by the function key. The selected function key lights up.

An OK key 215 is for use in confirming a selected item. Keys 216 to 219 are arrow keys and for use in moving a selected item upward, downward, leftward and rightward, respectively. A monochrome start key 221 lights up when it is ready to be depressed, and when it is depressed, a selected job is executed. A color start key 222 lights up when it is ready to be depressed, and when it is depressed, a selected job is executed. A stop key 223 is for use in, for example, pausing a job. It should be noted that in the example shown in the figure, there are various keys and buttons, but description thereof is omitted.

Figure 4:
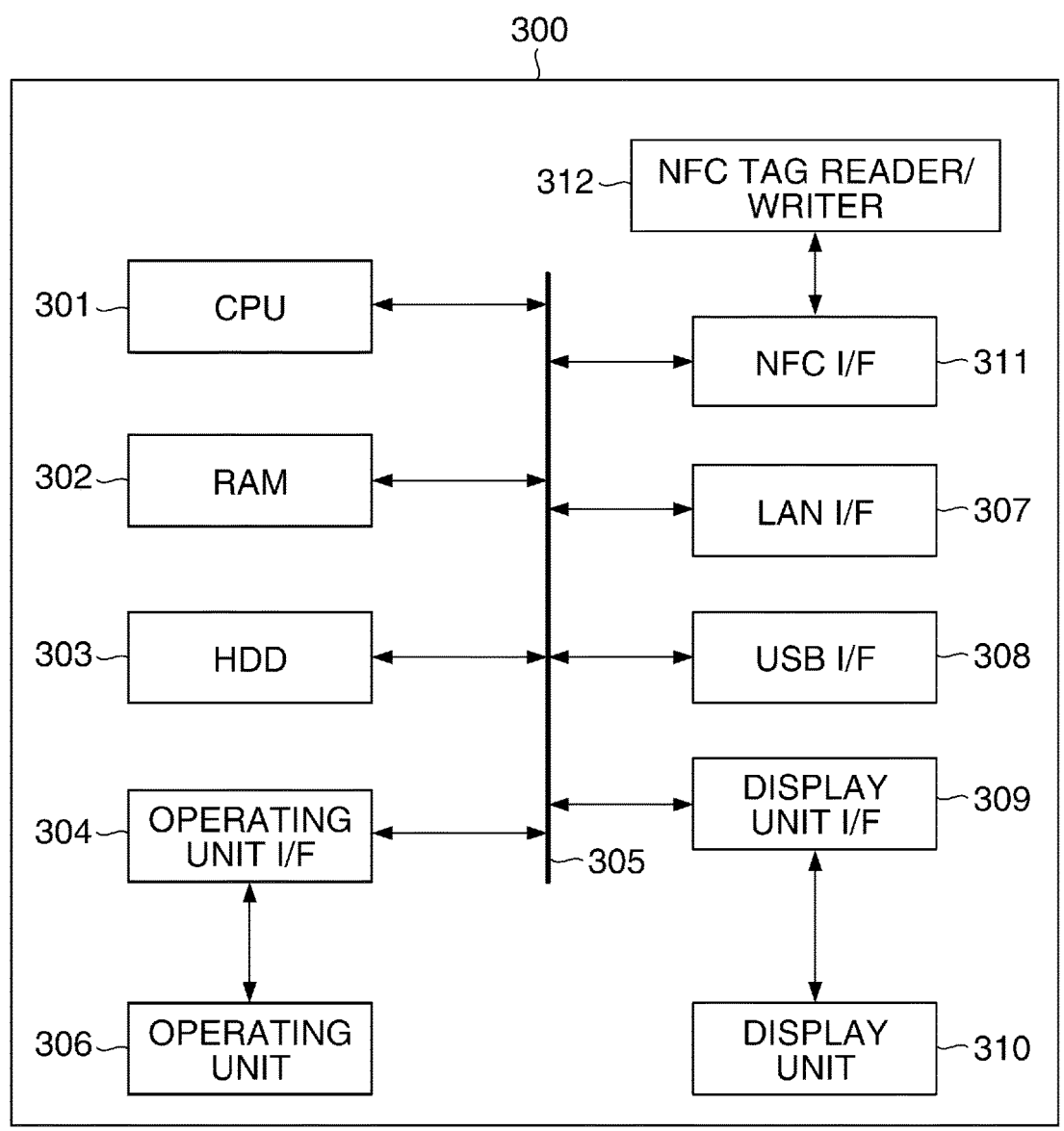
FIG. 4 is a diagram schematically showing a hardware arrangement of a mobile terminal in FIG. 1.

FIG. 4 is a diagram showing an exemplary hardware arrangement of the mobile terminal 300 in FIG. 1.

A CPU 301 is a processor which controls the overall system. A RAM 302 is a work memory for the CPU 301 to operate and is also used as a program memory in which programs are stored. An HDD 303 is a nonvolatile storage device such as a hard disk drive or an SSD (solid-state drive).

An operating unit I/F 304, which is an interface to an operating unit 306, receives input signals from the operating unit 306. Also, the operating unit I/F 304 passes information input from a user through the operating unit 306 to the CPU 301. A display unit I/F 309, which is an interface to a display unit 310 such as an LCD, outputs output signals to the display unit 310 in accordance with control by the CPU 301.

A LAN I/F 307 is an interface for connecting with a LAN including a wireless LAN and is for use in carrying out communications with other devices via the LAN. A USB I/F 308 is an interface for connecting to a USB device and is for use in carrying out communications with a USB device via a USB cable (not shown).

An NFC I/F 311, which is an interface to an NFC tag reader/writer 312, outputs a signal to the NFC tag reader/writer 312 in accordance with control by the CPU 301. The NFC I/F 311 also receives a signal from the NFC tag reader/writer 312 and sends it to the CPU 301.

The NFC tag reader/writer 312 is an RFID reader/writer which generates an electromagnetic field with which communication is possible only in a short range to enable near-field wireless communication between NFC-enabled devices. The components described above are placed on a system bus 305 as shown in the figure.

Figure 5A:
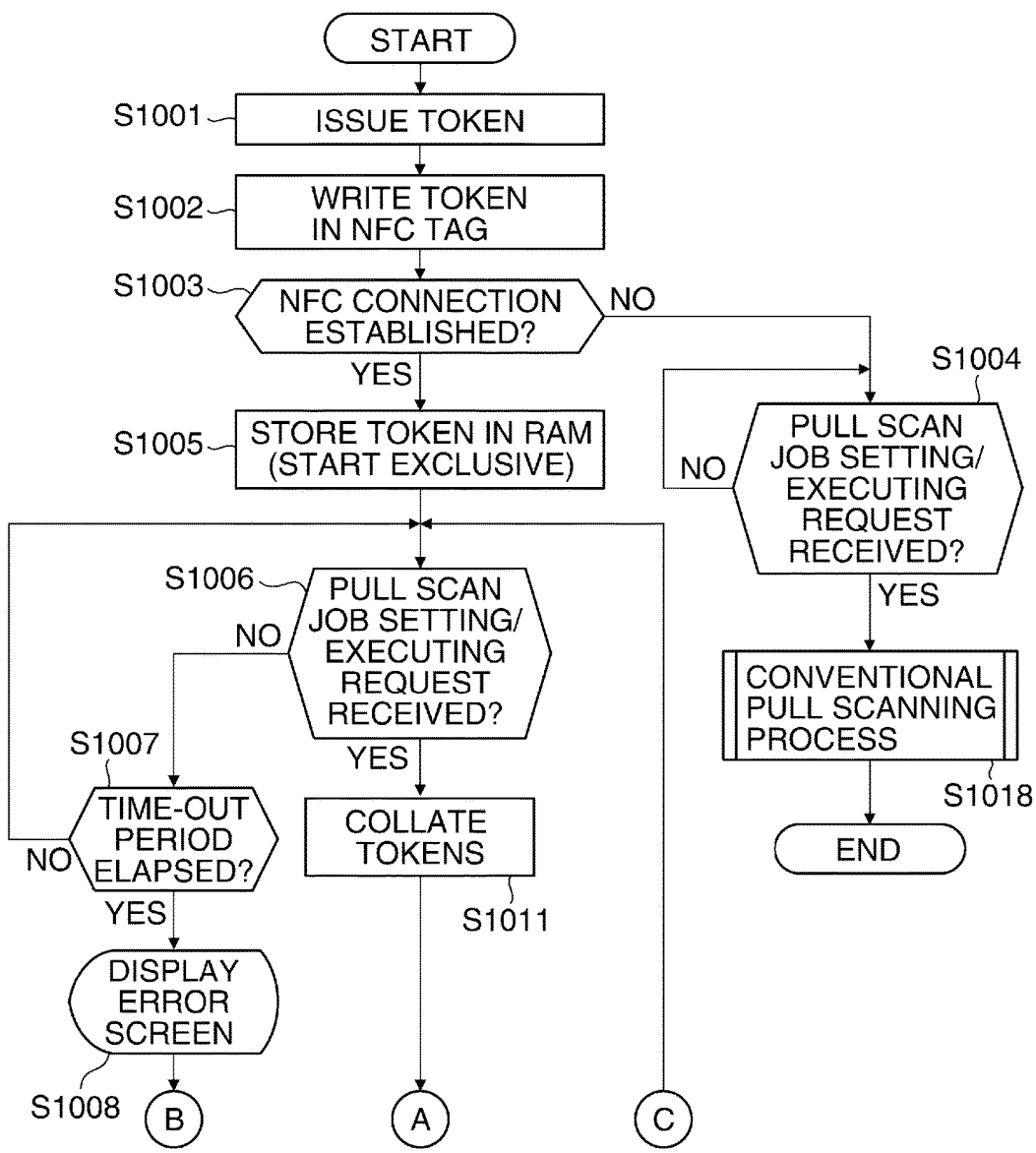
FIGS. 5A and 5B are flowcharts showing an exemplary pull scanning process which is carried out by the image forming apparatus.
Figure 5B:
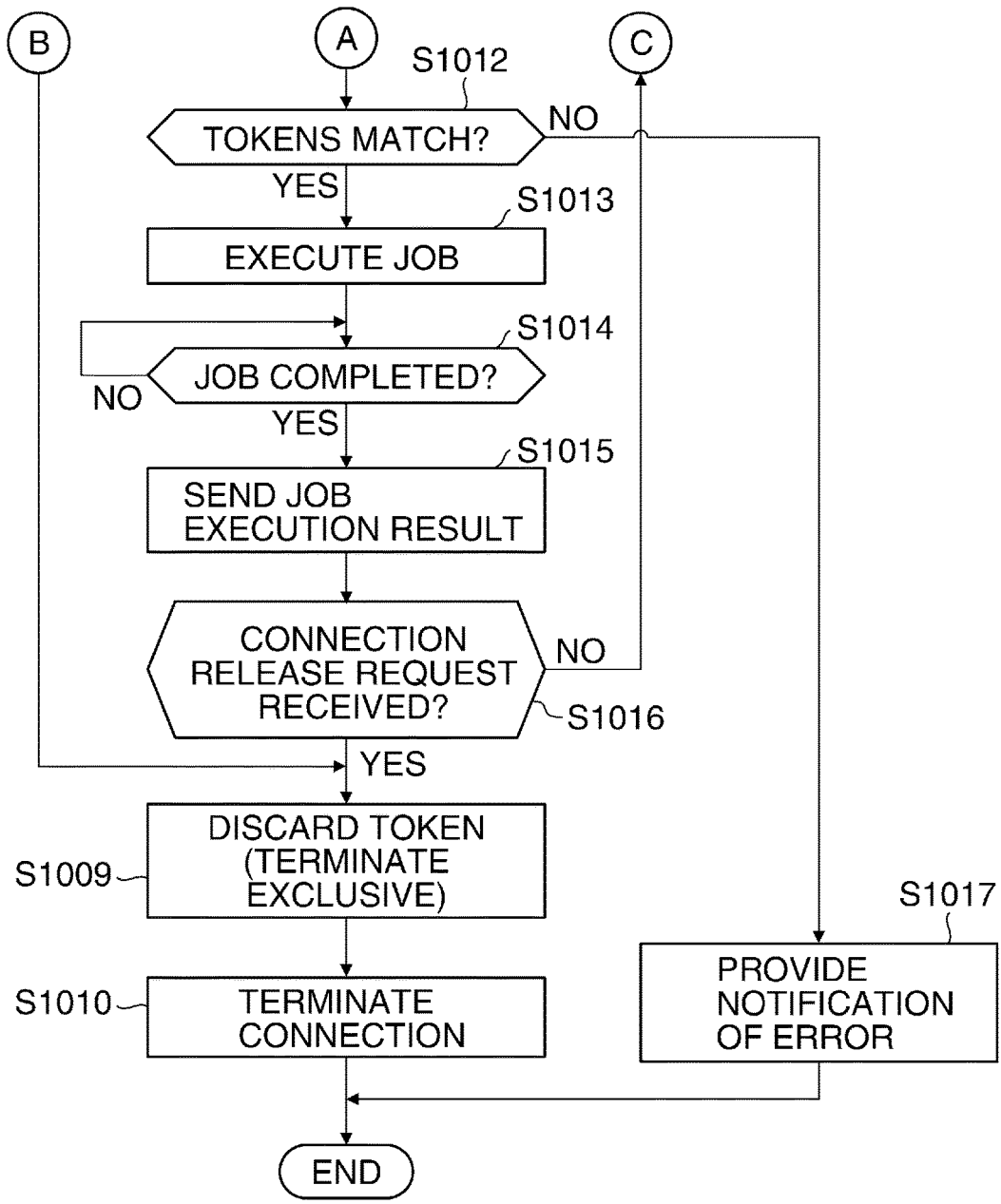

FIGS. 5A and 5B are flowcharts showing an exemplary pull scanning process which is carried out by the image forming apparatus 100. This process is implemented by the CPU 102 reading out and executing a control program stored in the program area of the ROM 104.

Referring to FIGS. 5A an 5B, first, the CPU 102 issues a token (step S1001) and writes it in the NFC tag 126 in advance (step S1002). The token means a unique ID and is used as a password for authentication as well.

Next, when the mobile terminal 300a is caused to touch (put close to) the image forming apparatus 100, and wireless communication using NFC is established between the NFC tag reader/writer 312 of the mobile terminal 300a and the NFC tag 126 of the image forming apparatus 100 (YES in step S1003), the process proceeds to step S1005.

On the other hand, when a pull scan job setting/execution request is received from the mobile terminal 300a (YES in step S1004) after Wi-Fi connection with the mobile terminal 300a is established without wireless communication being established using NFC (NO in the step S1003), the process proceeds to step S1018. In the step S1018, a conventional pull scan job process is carried out. Detailed description of the conventional pull scan job process in this step S1018 will be given later. It should be noted that the conventional pull scan job process in the step S1018 is also carried out when the CPU 102 receives a pull scan job setting/execution request via the network I/F 120 in the step S1004.

When wireless communication using NFC is established between the mobile terminal 300a and the image forming apparatus 100, the CPU 102 transfers the token in the NFC tag 126 to the RAM 103 and stores the same in the RAM 103 (step S1005). As a result, the mobile terminal 300a obtains an exclusive right to use the image forming apparatus 100, and exclusive control to reject a pull scanning execution request from any other mobile terminal is started.

Then, the CPU 102 judges whether or not it has received a pull scan job setting/execution request via the wireless communication I/F 123 after establishing Wi-Fi connection with the mobile terminal 300a (step S1006). At this time, the CPU 102 monitors pull scan job setting/execution request commands by polling and judges whether it has received a pull scan job setting/execution request. It should be noted that a pull scan job setting/execution request command includes setting information on pull scanning (a type of an original to be scanned, an image to be scanned off, etc.) as well as a pull scanning execution request.

When in the step S1006, a pull scan job setting/execution request has been received (YES in the step S1006), the process proceeds to step S1011. On the other hand, when it is judged that no pull scan job setting/execution request has been received (NO in the step S1006), and a time-out period set in advance has elapsed (YES in step S1007), the process proceeds to step S1008.

Figure 8A:
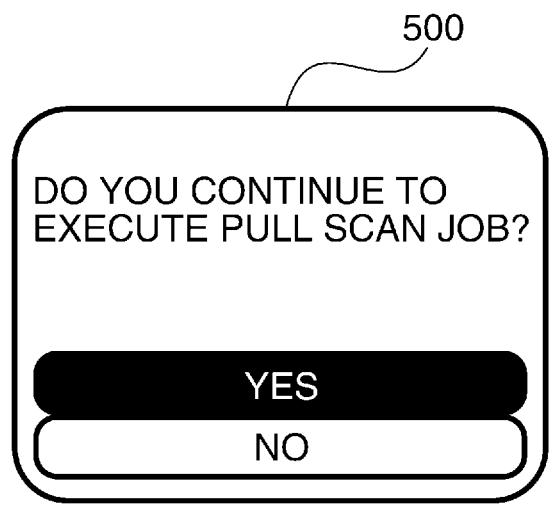
Figure 8B:
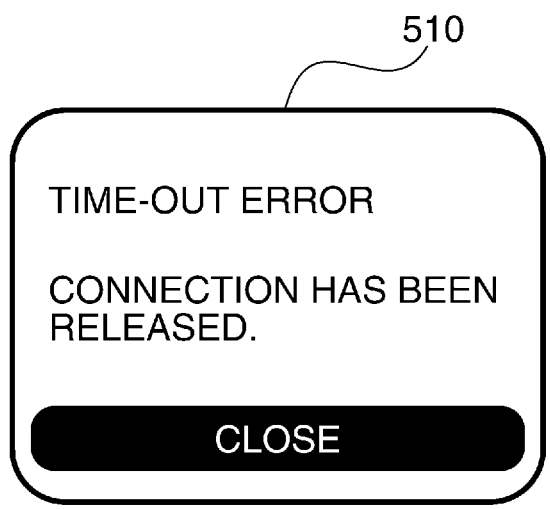

In the step S1008, the CPU 102 displays an error screen 510 in FIG. 8B, which is displayed when a time-out error has occurred, on the display unit 220 on the operating unit 110, followed by the process proceeding to step S1009. As a result, the user A who touched the image forming apparatus 100 with the mobile terminal 300a recognizes the occurrence of the time-out error and is prompted to perform a next operation.

In step S1011, the CPU 102 collates a token included in the received pull scan job setting/execution request and the token stored in the RAM 103 in the step S1005 with each other and judges whether or not these two tokens match. Upon judging that the two tokens do not match (NO in step S1012), the CPU 102 provides notification of an error to a mobile terminal, from which the pull scan job setting/ execution request has been received, via the wireless communication I/F 123 (step S1017) and terminates the process.

On the other hand, when it is judged in the step S1012 that the two tokens match (YES in step S1012), the process proceeds to step S1013. In the step S1013, the CPU 102 executes a pull scan job based on the setting information on pull scanning included in the received pull scan job setting/ execution request. When the pull scan job is completed (YES in step S1014), the CPU 102 sends the job execution result to the mobile terminal 300a (step S1015). The CPU 102 may be configured to, at this time, display a screen 500 for confirmation of continuation shown in FIG. 8A on the display unit 220 on the operating panel 110.

The CPU 102 then judges whether or not it has received a connection release request from the mobile terminal 300a via the wireless network 124 (step S1016). When no connection release request has been received, the process returns to the step S1006, in which the CPU 102 in turn waits until it receives a pull scan job setting/execution request again from the mobile terminal 300a. On the other hand, when a connection release request has been received, the process proceeds to step S1009.

It should be noted that the CPU 102 may be configured such that when continuous execution of the pull scan job is selected on the screen 500 in the step S1015, the process returns to the step S1006, and on the other hand, when termination of continuous execution of the pull scan job is selected, the CPU 102 carriers out the processes in the step S1009 and the subsequent steps.

As described above, since a job is not executed unless a token included in a pull scan job setting/execution request received in the step S1012 and a token stored in the RAM 103 match, only the user A using the mobile terminal 300a is allowed to cause the image forming apparatus 100 to continuously execute a pull scan job.

It should be noted that continuous execution may be selected either by touching a "YES" button on the screen 500 or by operating a key on the operating panel 110. Also, continuous execution may be terminated either by touching a "NO" button on the screen 500 or by operating a key on the operating panel 110.

In the step S1009, the CPU 102 discards the token stored in the RAM 103 and releases wireless communication connection with the mobile terminal 300a (step S1010), followed by terminating the process. Discarding the token stored in the RAM 103 enables the user B's mobile terminal 300b or the like to give a pull scan job setting/execution request to the image forming apparatus 100.

As described above, a token is stored in the RAM only when NFC connection with a communication terminal is detected, and the image forming apparatus is shifted into a mode in which it rejects a job setting/execution request from other terminals other than the communication terminal until the token stored in the RAM is discarded.

Moreover, in the present embodiment, to prevent release of connection between the mobile terminal and the image forming apparatus from being forgotten, connection is allowed to be released through operation on the image forming apparatus. It should be noted that when different instructions are issued from the image forming apparatus and the mobile terminal, the instruction from the image forming apparatus is given priority.

Figure 6:
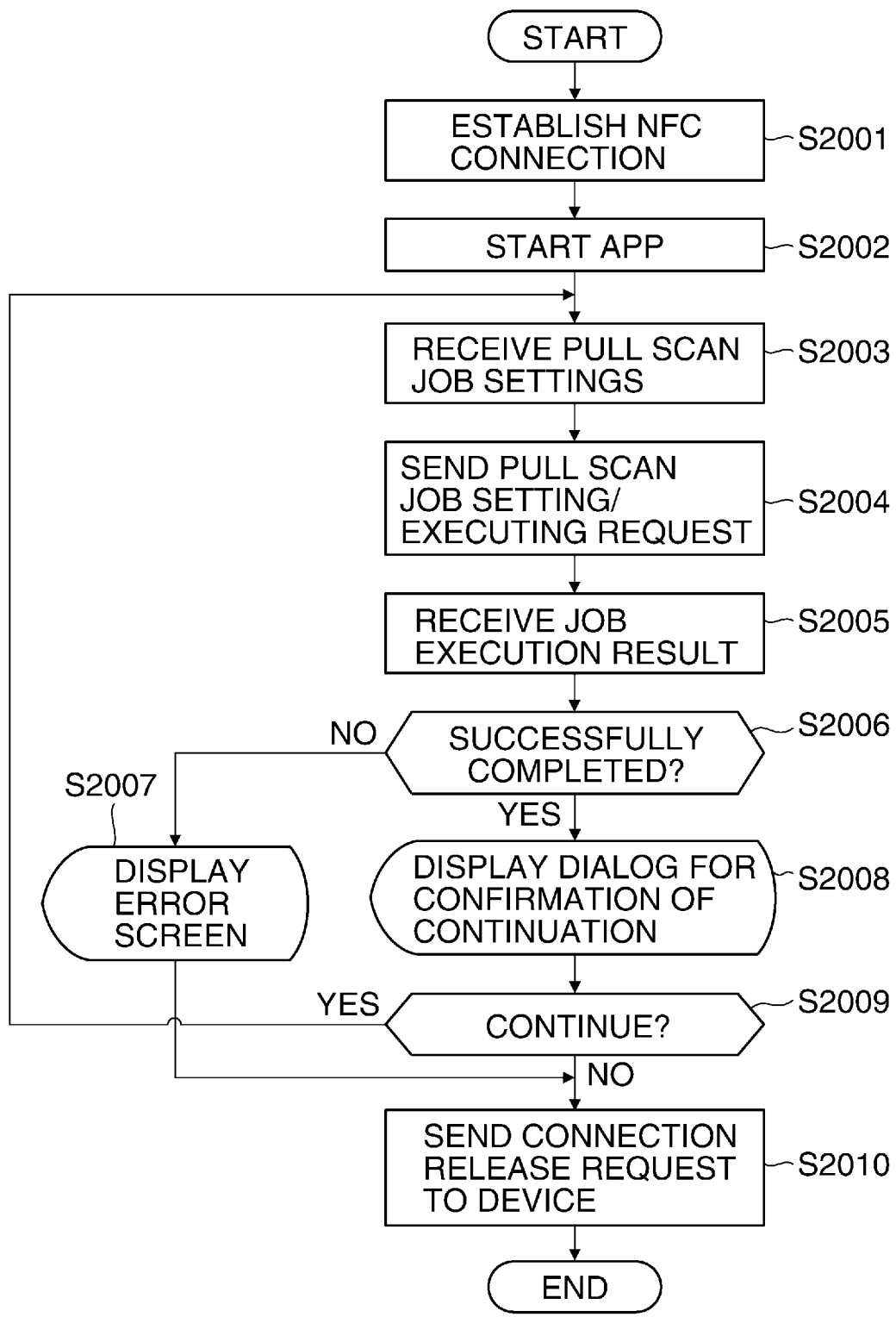
FIG. 6 is a flowchart showing an exemplary pull scanning process which is carried out by the mobile terminal.

FIG. 6 is a flowchart showing an exemplary pull scanning process which is carried out by the mobile terminal 300a. This process is implemented by the CPU 301 reading out and executing a control program stored in the HDD 303.

When the user A touches the image forming apparatus 100 with the mobile terminal 300a, wireless communication using NFC is established between the NFC tag reader/writer 312 of the mobile terminal 300a and the NFC tag 126 of the image forming apparatus 100. The CPU 310 then causes the NFC tag reader/writer 312 to read a URI scheme, an SSID, an encryption key, a token issued in the step S1001 in FIG. 5A, and so on from the NFC tag 126 (step S2001).

An SSID is an ID for identifying a wireless network, and up to 32 alphanumeric characters are arbitrarily set for the SSID. On a wireless LAN, communication is carried out using radio waves, and hence as distinct from a wired LAN, a state of "interference" in which communication with a plurality of access points is possible occurs. For this reason, SSIDs are allowed to be set for respective wireless LAN access points and terminals so that communication between only terminals of which SSIDs match is possible.

An encryption key is a key for use in carrying out encrypted communication using a wireless LAN. The mobile terminal 300a carries out wireless communication with the image forming apparatus 100 on a wireless LAN using the read SSID and encryption key. A URI scheme is an address which is written in such a form as a URI of a Web page, and opening a URI scheme starts an arbitrary app. In the present embodiment, a pull scanning executing application is automatically started using a URI scheme (step S2002).

Then, the CPU 301 establishes Wi-Fi connection with the image forming apparatus 100 and then causes the started pull scanning executing application to receive settings on a pull scan job configured by the user (step S2003). Upon receiving a pull scan job executing instruction issued by the user, the CPU 301 causes the mobile terminal 300a to send a pull scan job setting/execution request to the image forming apparatus 100 (step S2004). It should be noted that at the time of sending the pull scan job setting/execution request, the mobile terminal 300a sends it including the token read from the NFC tag 126 in the step S2001.

Figure 9A:
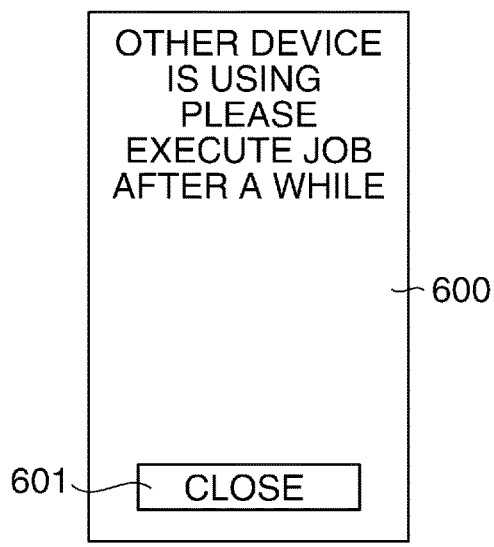

Then, upon receiving a job execution result from the image forming apparatus 100 (step S2005), the CPU 301 judges whether or not the pull scan job has been successfully completed (step S2006). Upon judging that the pull scan job has not been successfully completed, the CPU 301 displays an error screen 600 shown in FIG. 9A or an error screen 610 shown in FIG. 9B on the display unit 310 (step S2007), followed by the process proceeding to step S2010. It should be noted that cases where the pull scan job has not been successfully completed includes a case where tokens do not match (NO in the step S1012 in FIG. 5B) and a case where the pull scan job has been terminated with an error such as a communication error.

Figure 9C:
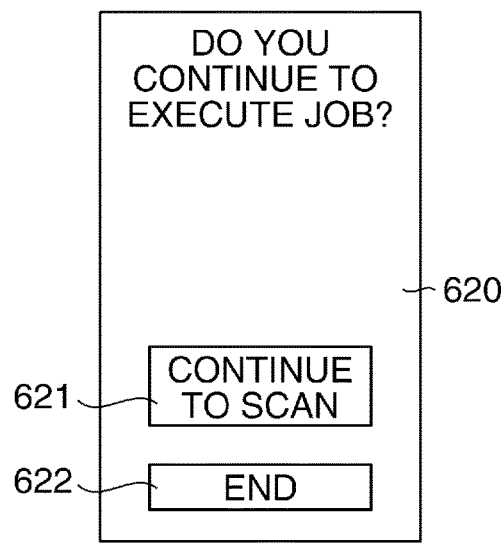
Figure 9B:
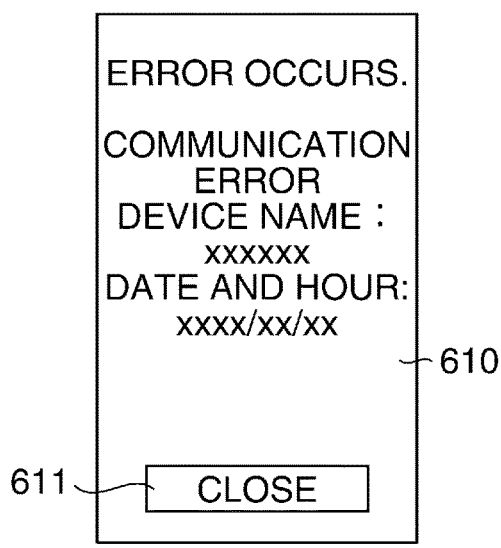

On the other hand, upon judging in the step S2006 that the pull scan job has been successfully completed, the CPU 301 displays a continuation confirmation screen 620 shown in FIG. 9C on the display unit 310 (step S2008), followed by the process proceeding to step S2009. A "continue to scan" button 621 and a "discontinue" button 622 are placed on the continuation confirmation screen 620 shown in FIG. 9C.

When the "continue to scan" button 621 is depressed (YES in the step S2009), the CPU 301 determines that the pull scan job is to be continuously executed, followed by the process returning to the step S2003, in which the CPU 301 in turn configures pull scan job settings and performs job submission again. On the other hand, when the "discontinue" button 622 is depressed (NO in the step S2009), the process proceeds to the step S2010.

In the step S2010, the CPU 301 sends a connection release request to the image forming apparatus 100 using the LAN I/F 307 via the wireless network 124 and terminates the process.

A detailed description will now be given of the conventional pull scanning process in the step S1018 in FIG. 5A.

Figure 7:
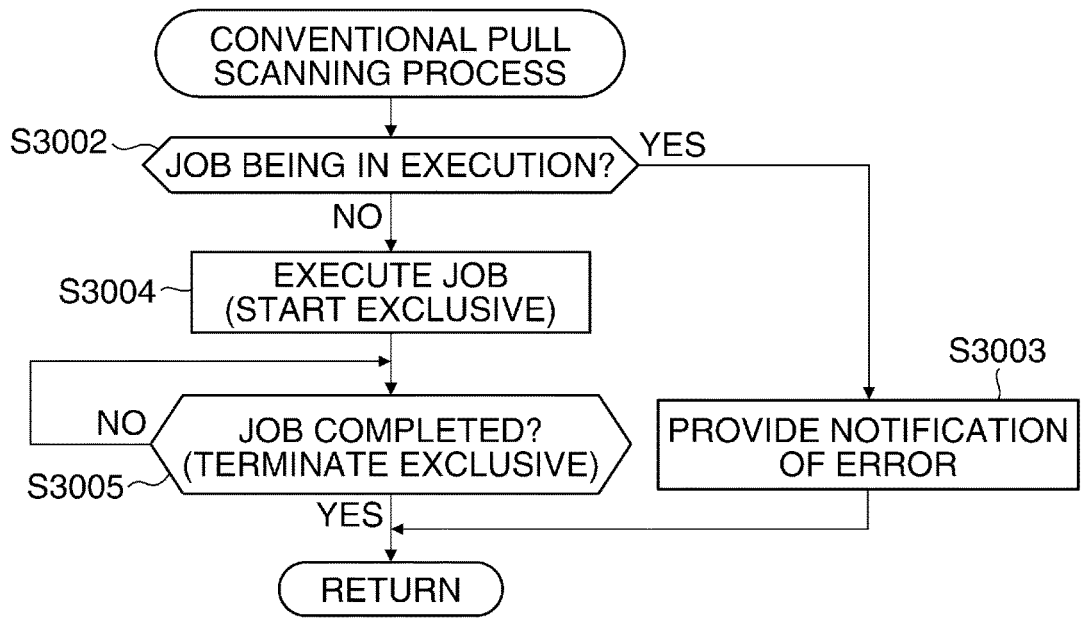
FIG. 7 is a flowchart showing in detail a conventional pull scanning process in step S1018 in FIG. 5A.

FIG. 7 is a flowchart showing in detail the conventional pull scanning process in the step S1018 in FIG. 5A.

In step S3002, the CPU 102 judges whether or not a pull scan job is in execution. Upon judging that a pull scan job is in execution, the CPU 102 provides notification of an error to a mobile terminal from which a pull scan job setting/execution request has been received (step S3003) and terminates the process.

On the other hand, upon judging that a pull scan job is not in execution, the CPU 102 executes a received pull scan job (step S3004). When this pull scan job is completed (YES in step S3005), exclusive control is brought to an end, followed by the process being terminated.

According to the embodiment described above, for a user who uses a device by operating a mobile terminal, a function of the device is continuously offered without being interrupted by other terminals, and this improves operability of a mobile terminal which is used as an external operating means.

Moreover, in a multi-user environment in which for a device, there are plurality of connecting forms using wired/wireless networks, USB, and so on, the device is shifted into a mode in which it is exclusively used for a predetermined time period exclusively in a case where NFC connection of a mobile terminal has been detected. As a result, for the pull scanning function faced with the problem of resource conflict in the main body of the apparatus main body, exclusive control is implemented without decreasing usability and availability of the image forming apparatus.

Although in the above description of the embodiment, a pull scan job is a target, it goes without saying that the effects of the present invention are obtained for other jobs as well.
Other Embodiments Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-115747, filed Jun. 4, 2014, which is hereby incorporated by reference herein in its entirety.

What is claimed is:

1. An image forming apparatus which executes a job in response to an instruction from a communication terminal, comprising:
at least one CPU, the at least one CPU configured to execute instructions stored in a memory to cause the image forming apparatus to:
establish a wireless communication by using a proximity wireless communication or establish the wireless communication by not using the proximity wireless communication;
determine whether the established wireless communication, by which a request to execute a scan job is received from the communication terminal, is established by using the proximity wireless communication; and
control to, when it is determined that the wireless communication is established by using the proximity wireless communication, reject a request to execute other scan jobs from communication terminals other than the communication terminal until receiving a connection release request from the communication terminal, and when it is determined that the wireless communication is not established by using the proximity wireless communication, reject a request to execute other scan jobs from communication terminals other than the communication terminal until execution of the scan job is completed.

2. The image forming apparatus according to claim 1, wherein the at least one CPU is configured to execute the instructions to further cause the image forming apparatus to:
issue a token and write the token in an NFC (near-field communication) tag;
store the token, which is written in the NFC tag, in the memory;
collate, upon receiving a request to execute the scan job, a token received together with the request to execute the scan job and the token stored in the memory with each other; and
determine, when the two tokens match as a result of the collation, that the wireless communication is established by using the proximity wireless communication.

3. The image forming apparatus according to claim 2, wherein the at least one CPU is configured to execute the instructions to further cause the image forming apparatus to:
display, when no request to execute a scan job has been received from the communication terminal before a lapse of a time-out period set in advance, an error screen,
discard the token stored in the memory, and
release connection with the communication terminal.

4. The image forming apparatus according to claim 1, wherein the at least one CPU is configured to execute the instructions to further cause the image forming apparatus to:
display, when execution of the scan job is completed, a screen asking whether to continue execution of a scan job.

5. The image forming apparatus according to claim 1, wherein the proximity wireless communication is near-field wireless communication using NFC (near-field communication), the wireless communication is W-Fi, and the scan job is a pull scan job.

6. A control method for an image forming apparatus which executes a job in response to an instruction from a communication terminal, comprising:

establishing a wireless communication by using a proximity wireless communication or establishing the wireless communication by not using the proximity wireless communication;

determining whether the established wireless communication, by which a request to execute a scan job is received from the communication terminal, is established by using the proximity wireless communication; and rejecting, when it is determined that the wireless communication is established by using the proximity wireless communication, a request to execute other scan jobs from communication terminals other than the communication terminal until receiving a connection release request from the communication terminal, and rejecting, when it is determined that the wireless communication is not established by using the proximity wireless communication, a request to execute other scan jobs from communication terminals other than the communication terminal until execution of the scan job is completed.

7. A non-transitory computer-readable storage medium storing a program for causing a computer to execute a control method for an image forming apparatus which executes a job in response to an instruction from a communication terminal, the control method comprising:

establishing a wireless communication by using a proximity wireless communication or establishing the wireless communication by not using the proximity wireless communication;

determining whether the established wireless communication, by which a request to execute a scan job is received from the communication terminal, is established by using the proximity wireless communication; and rejecting, when it is determined that the wireless communication is established by using the proximity wireless communication, a request to execute other scan jobs from communication terminals other than the communication terminal until receiving a connection release request from the communication terminal, and rejecting, when it is determined that the wireless communication is not established by using the proximity wireless communication, a request to execute other scan jobs from communication terminals other than the communication terminal until execution of the scan job is completed.

* * * * *